(12) United States Patent
Darr et al.

(10) Patent No.: US 9,354,031 B1
(45) Date of Patent: May 31, 2016

(54) SYSTEM FOR MEASURING AND MARKING MEASUREMENTS

(71) Applicants: Donald Lee Darr, Vail, AZ (US); Irene Ann Soat-Darr, Vail, AZ (US)

(72) Inventors: Donald Lee Darr, Vail, AZ (US); Irene Ann Soat-Darr, Vail, AZ (US)

( * ) Notice: Subject to any disclaimer, the term of this patent is extended or adjusted under 35 U.S.C. 154(b) by 44 days.

(21) Appl. No.: 14/268,935

(22) Filed: May 2, 2014

(51) Int. Cl.
*G01B 3/10* (2006.01)

(52) U.S. Cl.
CPC ...... *G01B 3/1084* (2013.01); *G01B 2003/1089* (2013.01)

(58) Field of Classification Search
CPC .................. G01B 3/1084; G01B 2003/1089
USPC ........... 33/414, 474, 480, 756, 759, 761, 768, 33/760
See application file for complete search history.

(56) References Cited

U.S. PATENT DOCUMENTS

| | | | | |
|---|---|---|---|---|
| 6,789,329 B1* | 9/2004 | Hester | ...................... | B44D 3/38 33/414 |
| 7,228,644 B1* | 6/2007 | Hellem | ...................... | B25H 7/02 33/465 |
| 2003/0037454 A1* | 2/2003 | Reed | ..................... | G01B 3/1041 33/761 |
| 2004/0168335 A1* | 9/2004 | Pritchard | ................. | B44D 3/38 33/760 |
| 2006/0196072 A1* | 9/2006 | Lewis | .................. | G01B 3/1071 33/760 |
| 2008/0052943 A1* | 3/2008 | Brooks | ............... | G01B 3/1084 33/760 |
| 2009/0031571 A1* | 2/2009 | Ogilvie | .................... | B25H 7/00 33/456 |
| 2009/0271999 A1* | 11/2009 | Alker | ................... | G01B 3/1041 33/762 |
| 2012/0036727 A1* | 2/2012 | McCarthy | ............ | B43K 23/001 33/760 |
| 2012/0240419 A1* | 9/2012 | Wagner | ..................... | B43L 7/12 33/275 R |
| 2014/0109417 A1* | 4/2014 | Kocenko | ............. | G01B 3/1084 33/414 |
| 2014/0165414 A1* | 6/2014 | Smith | .................. | G01B 3/1084 33/768 |

* cited by examiner

*Primary Examiner* — G. Bradley Bennett
(74) *Attorney, Agent, or Firm* — Plager Schack LLP

(57) ABSTRACT

A system measures and marks a measurement. The system has a body. A measurement tape is coiled within the body which, when extended from the body, is held in place by engaging a lock button attached to the body. A chalk line is coiled within the body which, when extended from the body is held in place by engaging a chalk line lock. A chalk reel handle is attached to the body and configured to wind the chalk line into the body. The measurement tape makes the measurement and the chalk line marks the measurement.

5 Claims, 3 Drawing Sheets

SYSTEM FOR MEASURING AND MARKING MEASUREMENTS

BACKGROUND

The embodiments herein relate generally to tools that can be used by hand.

SUMMARY

A system measures and marks a measurement. The system has a body. A measurement tape is coiled within the body which, when extended from the body, is held in place by engaging a lock button attached to the body. A chalk line is coiled within the body which, when extended from the body is held in place by engaging a chalk line lock. A chalk reel handle is attached to the body and configured to wind the chalk line into the body. The measurement tape makes the measurement and the chalk line marks the measurement In some embodiments, the chalk line is further mechanically coupled to a chalk line handle. The chalk line handle is held by a chalk handle notch on the body wherein the chalk line handle displaces some of the chalk line from the body.

In some embodiments, a bottom of the body rotationally coupled to a square flap that is rotated from being parallel to being perpendicular with the body. A first square arm is rotationally coupled to the bottom of the body. A second square arm rotationally coupled to the first square arm. In this manner, deploying the square flap, then the first square arm and the second square arm provides functionality of a carpenter's square.

In some embodiments, the body is attached to a belt clip to be worn on a user's belt. In some embodiments, the body is attached to a pencil sharpener.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
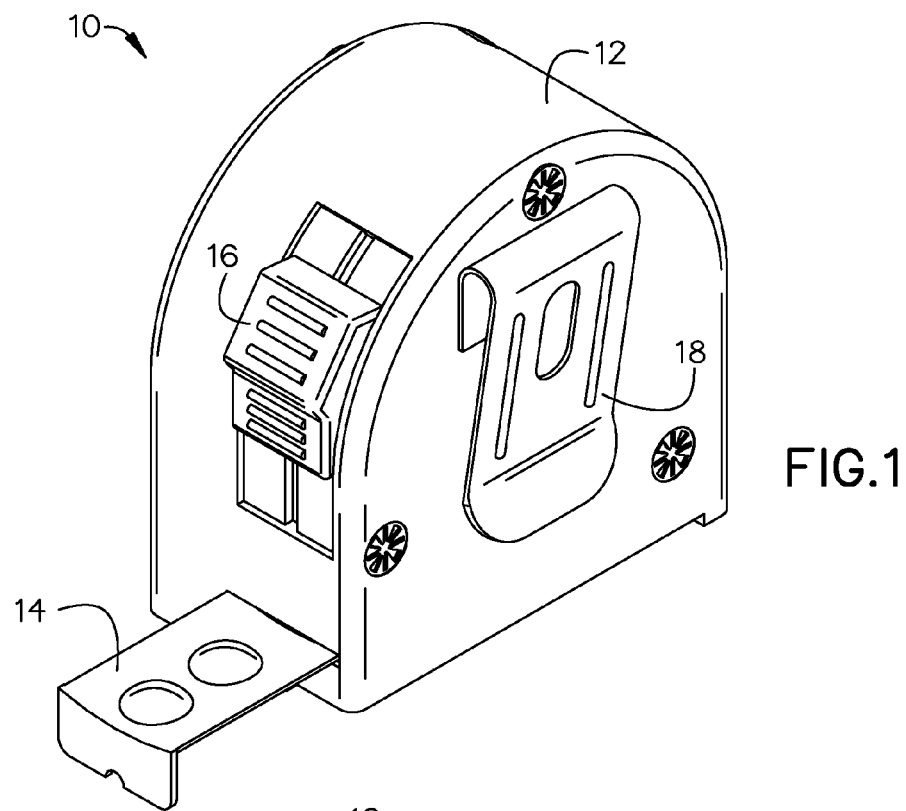
FIG. 1 is a top-front-perspective view of an embodiment of the invention.

By way of example, and referring to FIG. 1, one embodiment of system 10 comprises body 12 which houses measurement tape 14 in a coiled manner as in a traditional tape measure that can be locked in place with lock button 16. Body 12 is mechanically coupled to belt clip 18 so that the system can be worn on the user's belt.

Figure 2:
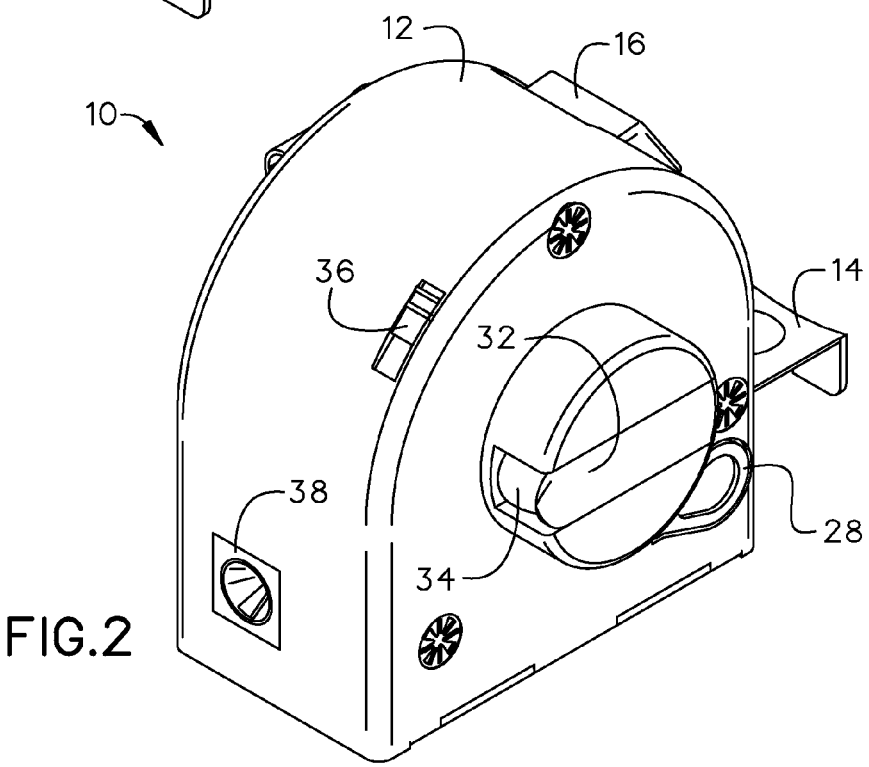
FIG. 2 is a top-rear-perspective view of an embodiment of the invention.
Figure 3:
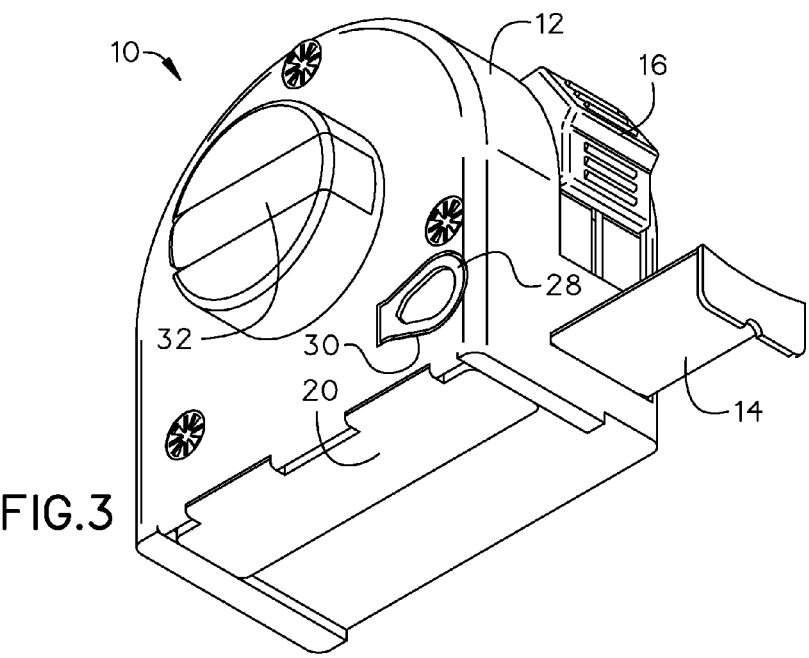
FIG. 3 is a bottom-front-perspective view of an embodiment of the invention

Turning to FIG. 2 and FIG. 3. Body 12 is further mechanically coupled to square flap 20 which can be immediately adjacent or parallel to the bottom of body 12. The bottom of body 12 is further rotationally coupled to first square arm 22.

Figure 4:
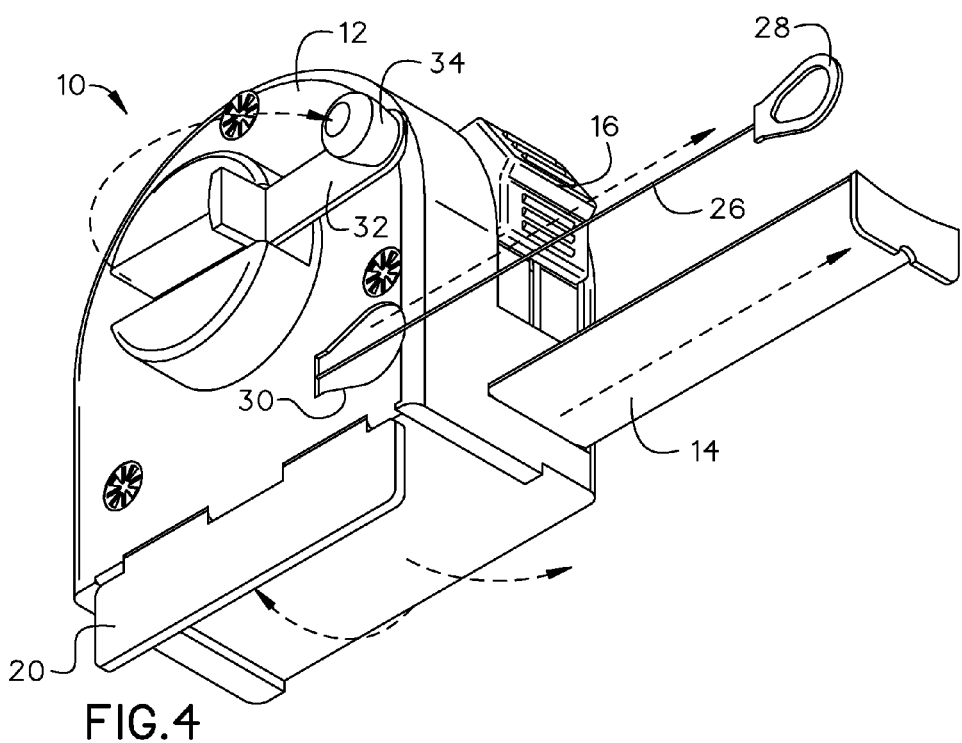
FIG. 4 is a bottom-front-perspective view of an embodiment of the invention demonstrating subcomponent articulations.

First square arm 22 is further rotationally coupled to second square arm 24. A user can deploy square flap 20, then first square arm 22 and second square arm 24 to act as a carpenter's square as shown in FIG. 4.

Body 12 is further mechanically coupled to chalk line 26 which can be unwound and pulled from body 12 by chalk line handle 28. Chalk line 26 can then be used to apply chalk to a surface and then be wound into body 12 by turning chalk reel pivot arm 32 with chalk reel handle 34 as shown in FIG. 4. This results in chalk line handle 28 resting in chalk handle notch 30. Alternately, chalk line 26 can be locked in place by applying chalk line lock 36 as shown in FIG. 2.

In some situations it may be preferable to mark a surface with a pencil. To assist in that regard, pencil sharpener 38 is attached to body 12 to permit a user to sharpen a pencil.

Figure 5:
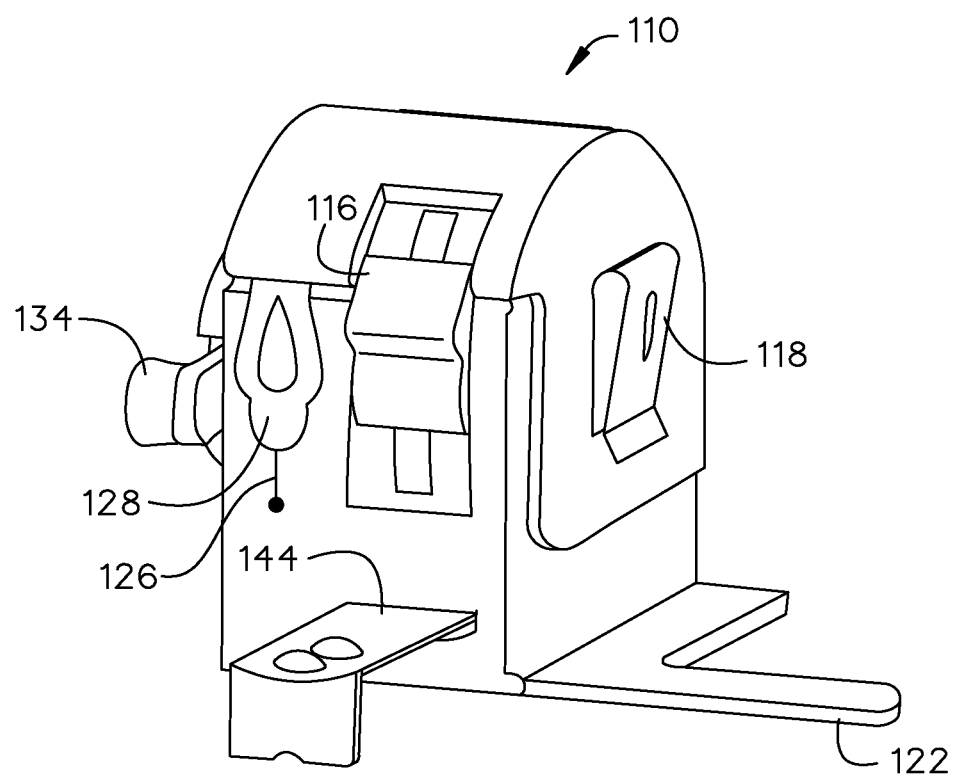
FIG. 5 is a front perspective view of an embodiment of the invention.

Turning to FIG. 5, system 110 comprises a body which houses measurement tape 114 in a coiled manner as in a traditional tape measure that can be locked in place with lock button 116. The body is mechanically coupled to belt clip 118 so that system 110 can be worn on the user's belt. Note that square 122 is mechanically coupled to the body and configured to rotate about a lower edge of the body and to be housed within the body. Chalk line 126 is mechanically coupled to chalk line handle 28. Chalk line 126 can then be used to apply chalk to a surface and then be wound into the body by turning chalk reel handle 134.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for measuring and marking a measurement, the system comprising:
    a body;
    a measurement tape that is coiled within the body which, when extended from the body is held in place by engaging a lock button attached to the body;
    a chalk line coiled within the body which, when extended from the body is held in place by engaging a chalk line lock;
    a chalk reel handle attached to the body and configured to wind the chalk line into the body;
    a square flap, rotatably coupled to a bottom of the body and adapted to be deployed in a first direction;
    a square, rotatably coupled to a side of the body and adapted to be deployed in a second direction; wherein the first direction is perpendicular to the second direction;
    wherein the measurement tape makes the measurement and the chalk line marks the measurement.

2. The system of claim 1, wherein the chalk line is further mechanically coupled to a chalk line handle which is held by a chalk handle notch on the body wherein the chalk line handle displaces some of the chalk line from the body.

3. The system of claim 1, further comprising
    wherein the square flap has a rectangular shape
    wherein the square has an L-shape with a first rectangle and a second rectangle joined at a right angle.

4. The system of claim 1, a pencil sharpener attached to the body.

5. The system of claim 1, a belt clip attached to the body.

* * * * *